United States Patent [19]
McGehee

[11] 3,896,769
[45] July 29, 1975

[54] ANIMAL GROOMING DEVICE
[75] Inventor: Bobby L. McGehee, Seattle, Wash.
[73] Assignee: Design Technology Corporation, Seattle, Wash.
[22] Filed: Sept. 7, 1973
[21] Appl. No.: 395,295

[52] U.S. Cl. ............... 119/122; 119/103; 119/119; 269/243
[51] Int. Cl. ............................................. A01k 1/04
[58] Field of Search 119/19, 99, 103, 109, 122–125, 119/118, 119; 403/104, 109, 241, 187, 384; 269/243

[56] References Cited
UNITED STATES PATENTS

| | | | |
|---|---|---|---|
| 521,265 | 6/1894 | Haberthur | 269/243 X |
| 2,270,448 | 1/1942 | Juhl | 269/243 |
| 2,620,025 | 12/1952 | Powers | 403/104 X |
| 3,120,836 | 2/1964 | Brauning | 119/99 X |
| 3,266,464 | 8/1966 | Davis | 119/109 X |
| 3,744,457 | 7/1973 | Heine | 119/103 |

Primary Examiner—Louis G. Mancene
Assistant Examiner—J. N. Eskovitz
Attorney, Agent, or Firm—Seed, Berry, Vernon & Baynham

[57] ABSTRACT

A grooming device is disclosed for restraining animals for grooming which is fully adjustable to allow for various animal heights and grooming positions. The grooming device includes a position locking clutch and collet designed for one-hand operation to minimize the effort required to secure the vertically adjustable grooming post boom. Damping means are included on the end of the support housing for the boom to prevent sudden height reductions of the grooming post boom when being adjusted in height so as to prevent the boom from striking the tethered animal. Clamping means are provided for temporary or permanent mounting to the center or edge of a grooming table of variable thickness.

3 Claims, 3 Drawing Figures

PATENTED JUL 29 1975　　　　　　　　　　　　　　3,896,769

ANIMAL GROOMING DEVICE

BACKGROUND OF THE INVENTION

1. Field of the Invention

This invention relates to an animal grooming device.

2. Prior Art Relating to the Disclosure

Numerous grooming devices for animals have been developed, as exemplified by U.S. Pat. No. 3,266,464, to Davis, and U.S. Pat. No. 3,120,836, to Brauning. Both of these patents disclose an animal grooming device having a grooming post boom which is adjustable in height; however, the adjustment locking devices of these structures are not designed for easy operation by one hand nor do the patents disclose any means of preventing sudden slippage of the adjustable grooming post boom onto the tethered animal during adjustment.

SUMMARY OF THE INVENTION

An animal grooming device is disclosed including (1) a horizontal support for the animal, (2) a hollow support housing, (3) clamping means secured to the housing for securing the grooming device to the support, (4) a clutch and collet means designed for one-hand operation secured to the upper end of the housing, and (5) a grooming post boom having an upright portion and a laterally extending portion, the upright portion telescoping into the support housing and extending through the clutch and collet means.

The primary objects of this invention are (1) to provide an adjustable animal grooming device that includes a locking device for the grooming post boom easily and readily operable using one hand, (2) to provide an animal grooming device that is adjustable for animals of various sizes in various grooming position, (3) to provide a grooming device that is compact, portable and capable of being permanent mounted, and (4) to provide an animal grooming device including means preventing sudden slippage of the grooming post boom onto the tethered animal.

DETAILED DESCRIPTION OF THE INVENTION

Figure 1:
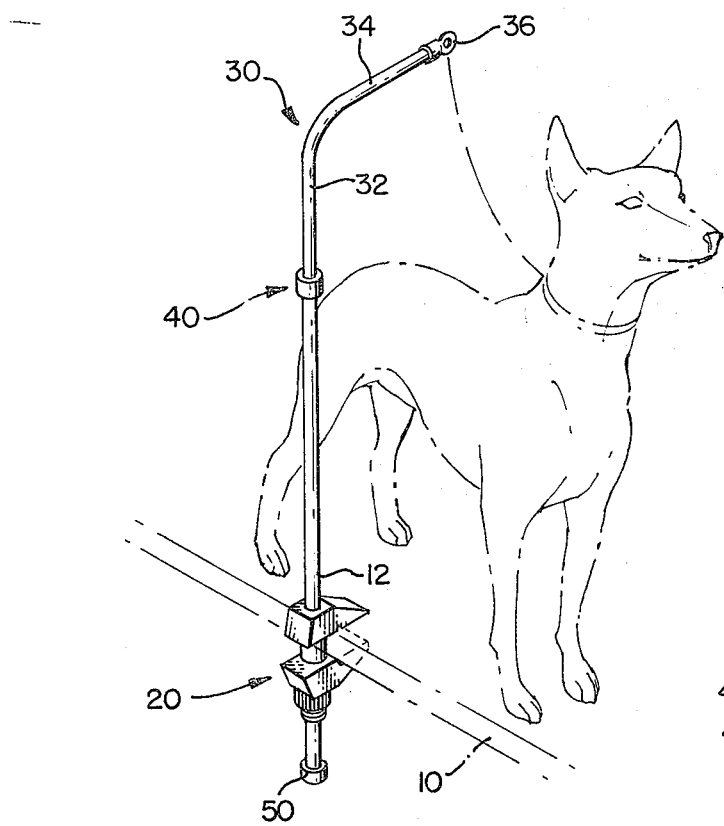
FIG. 1 is a perspective view of the grooming device of this invention secured to a grooming table.
Figure 2:
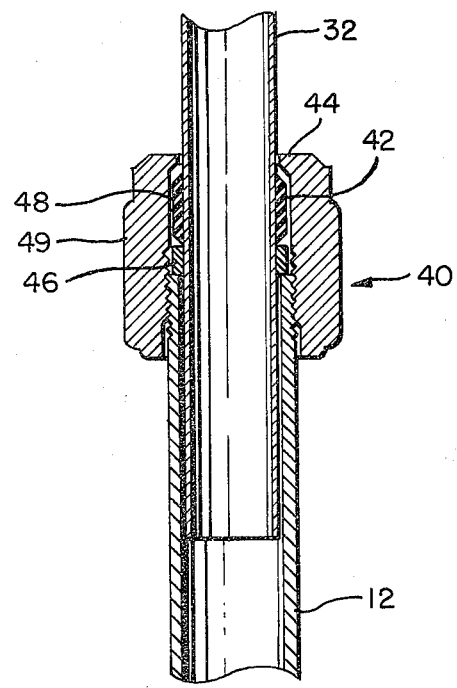
FIG. 2 is a vertical cross-section of the boom support housing and grooming post boom showing the clutch and locking collet.
Figure 3:
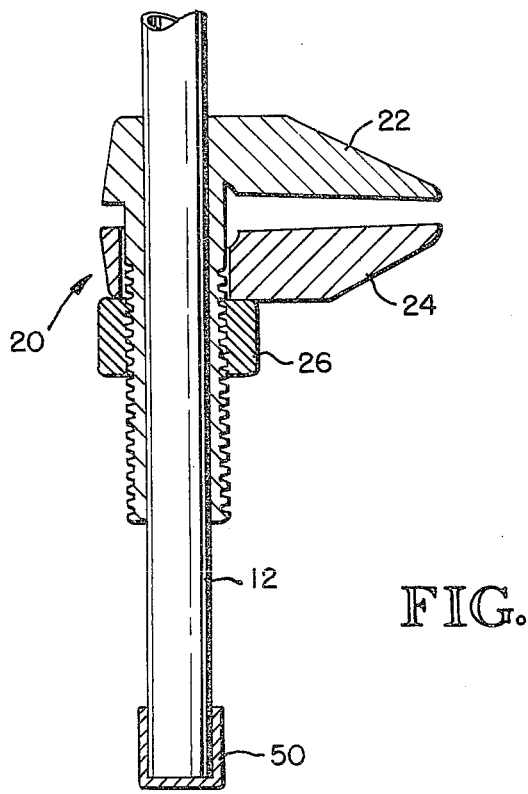
FIG. 3 is a vertical cross-sectional view of the animal grooming device showing the table clamp means and the cap providing damping action for the grooming post boom.

FIG. 1 shows the animal grooming device of this invention attached to a grooming table 10 by means of an easily adjustable clamp means 20. The animal grooming device includes a hollow, tubular support housing 12 of metal, plastic or other suitable material having a threaded upper portion and a lower portion secured to clamp means 20 by welding, gluing or by fasteners. A tubular grooming post boom 30, having an upright portion 32 and a laterally extending portion 34, is adapted to telescope into housing 10. An eye adapter 36 is attached to the outer end of the laterally extending portion of the boom and is designed to accept any of the many standard groom loop snap clasps.

Adjustment of the height of the boom is controlled by a clutch and locking collet 40 designed for operation with one hand. The clutch 42 is an annular member having internal threads in the lower portion thereof threaded to match the threads on the upper portion of the housing 12. The upper portion of the clutch is provided with an inner directed flange 44 which confines an annular bushing 46 and annular locking collet 48 resting on the top edge of the housing. When the clutch is rotated to move it downwardly relative to the support housing 12, the flange 44 presses against the locking collet 48 of rubber, leather or other suitable material to constrict and secure the grooming post boom in place. When the clutch is rotated in the opposite direction, pressure against the collet is released, allowing the boom to be adjusted vertically. A hand nut 49 may be provided around the external surface of the clutch 42 to provide a suitable hand grip surface.

The clamp 20 consists of three parts: an upper foot pad 22, a lower foot pad 24 and a clamp nut 26. The upper pad 22 includes a threaded portion through which the annular housing 12 extends and is secured, and a laterally extending portion which contacts the upper surface of the grooming table or other support. The lower pad includes a laterally extending portion contacting the underside of the table or other support and an annular opening allowing it to fit over the threaded portion of the upper pad. The clamp nut 26 is threaded on the threaded portion of the upper pad and presses the lower pad into contact with the underside of the table to clamp the grooming device in place.

A cap 50 covers the lower end of the housing 10 and is designed to trap a column of air in the housing which contributes to damping of the boom when released by the clutch and collet to prevent sudden downward height changes which may strike the tethered animal.

The animal grooming device described provides for infinite positioning of the boom between a fully collapsed and a fully extended position, allowing it to be adjusted for all sizes of animals and grooming positions.

The embodiments of the invention in which an exclusive property or privilege is claimed is claimed are defined as follows:

1. An animal grooming device comprising:
   a hollow, tubular, open-ended support;
   clamping means secured to the lower end of the support for securing the grooming device to a horizontal support;
   a grooming post having an upright portion and a laterally extending portion, with the upright portion telescoping into the hollow support;
   clutch and collet means designed for one-hand operation for adjustment of the height of the grooming post, including (1) an annular clutch ring surrounding the grooming post where it telescopes into the housing threaded for vertical movement to the upper terminating end of the housing, the annular clutch ring including a flange at its upper end having an inner sidewall portion spaced away from the outer wall of the grooming post providing an annular space therebetween, (2) a bushing resting against the upper terminating end of the hollow support held in place by the clutch ring, and (3) a flexible, annular collet ring substantially filling the annular space held in place within the annular space by the clutch ring, the clutch ring, on turning in one direction, pressing the flange of the clutch ring against the collet ring, constricting and forcing the collet ring against the grooming post, preventing movement thereof, and, on turning of the clutch ring in the opposite direction, releasing the grooming post for vertical adjustment; and damping means restricting the downward stroke of the grooming post boom on release of clutch and collet means for vertical adjustment.

2. The device of claim 1 wherein the damping means includes a cap covering the lower end of the hollow housing support to trap a column of air within the housing.

3. The device of claim 1 wherein the clamping means includes an upper pad having a threaded portion secured to and extending along the length of the housing and a laterally extending portion adapted to contact the upper surface of the horizontal support, a lower pad secured over the threaded portion of the upper pad having a laterally extending portion opposite the laterally extending portion of the upper pad adapted to contact the lower surface of the horizontal support, and a threaded locking nut on the threaded portion of the upper pad for locking the upper and lower pads in clamping position to the horizontal support.

* * * * *